ically as the individual an-# United States Patent

Thompson et al.

[15] 3,691,279

[45] Sept. 12, 1972

[54] ANTIBIOTIC NEBRAMYCIN AND PREPARATION THEREOF

[72] Inventors: Robert Q. Thompson, Greenwood, Ind. 46142; William M. Stark, Indianapolis, Ind. 46226; Calvin E. Higgens, Indianapolis, Ind. 46227

[73] Assignee: Eli Lilly and Company, Indianapolis, Ind.

[22] Filed: April 15, 1970

[21] Appl. No.: 28,212

Related U.S. Application Data

[63] Continuation-in-part of Ser. Nos. 488,109, Sept. 17, 1965, abandoned, and Ser. No. 798,587, Feb. 12, 1969, abandoned.

[52] U.S. Cl. .....................424/116, 424/118, 195/80
[51] Int. Cl. ..............................................A61k 21/00

[58] Field of Search .................424/116, 118; 195/80

[56] References Cited

OTHER PUBLICATIONS

Derwent Farmdoc No. 29,579, BE 697,319, Published 10-20-67, pages 363- 386

*Primary Examiner*—Jerome D. Goldberg
*Attorney*—Everet F. Smith and Walter E. Buting

[57] ABSTRACT

Antibiotic complex nebramycin, obtained by culturing *Streptomyces tenebrarius* ATCC 17920 and isolated by elution from a cationic resin or precipitation as insoluble salts of alkylsulfoacetates, and the individual antibiotic factors thereof, said complex and factors having high gram-negative activity.

7 Claims, 6 Drawing Figures

— 1 —

ANTIBIOTIC NEBRAMYCIN AND PREPARATION THEREOF

CROSS-REFERENCE

This application is a continuation-in-part of our copending application Ser. No. 488,109, filed Sept. 17, 1965 and application Ser. No. 798,587, filed Feb. 12, 1969, both now abandoned.

SUMMARY

This invention relates to a novel antibiotic substance and to its preparation. More particularly, this invention relates to a novel antibiotic complex designated herein as nebramycin and to the individual antibiotic factors which can be isolated from the said complex. Nebramycin has previously been referred to and designated as tenebrimycin or tenemycin.

The novel antibiotic complex provided by this invention is produced by growing the organism *Streptomyces tenebrarius* ATCC 17920 in a suitable culture medium under submerged aerobic fermentation conditions and, as isolated, can yield at least eight factors, each having antibiotic activity. The number of factors and the relative abundance thereof isolated from the antibiotic complex can vary substantially depending upon the method of isolation employed in separating the individual factors from the antibiotic complex recovered from the fermentation broth.

Either of two alternative isolation procedures can conveniently be employed in recovering the antibiotic complex. In the first of these procedures, the crude fermentation broth is filtered and the filtrate is adjusted to pH 5.5 and then chromatographed over a cationic exchange resin of the IRC–50 type in the ammonium cycle. The antibiotic complex is eluted from the column with 0.1 N sulfuric acid and the active eluate fractions are combined and further purified to obtain the sulfate of the nebramycin complex. In the alternative isolation procedure the antibiotic broth at pH 5.5 is treated with an alkylsulfonic acid, an alkyl-benzenesulfonic acid or an alkylsulfoacetate, wherein the alkyl group has from 10–18 carbon atoms. By this treatment the corresponding insoluble salt of the nebramycin complex is obtained. The salt is isolated by filtration, and the nebramycin complex is obtained therefrom by treatment with ammonium hydroxide. The procedure employed to obtain the individual factors comprising the nebramycin complex can also vary. In one such procedure, the factors can be separated by chromatography of a solution of the nebramycin sulfate over a cationic exchange resin of the IRC–50 type in the ammonium cycle, followed by elution first with 0.1 N ammonium hydroxide and finally with 0.3 N ammonium hydroxide. This procedure will be referred to hereinafter as the stepwise elution procedure. By this isolation procedure, the major factors obtained are nebramycin I, nebramycin I', nebramycin II, nebramycin IV, nebramycin V, nebramycin V', and nebramycin VI. Negligible amounts of other antibiotic factors are also present.

As is apparent from the foregoing, in the nomenclature employed herein, the term "nebramycin" is used to designate the antibiotic complex, while the various factors obtained from the complex are designated as nebramycin I, nebramycin II, and the like.

In an alternative separation technique, the nebramycin complex, either as the free base or as a salt, is passed over a column packed with a cationic resin of the IRC–50 type, and the individual factors are eluted from the column using a gradient elution technique. This isolation procedure affords the individual factors nebramycin II, nebramycin IV, and nebramycin V', and will be referred to hereinafter as the gradient elution procedure. Negligible quantities of other antibiotic factors are also obtained.

The nebramycin complex and the individual factors thereof are highly effective in preventing the growth of microorganisms which are pathogenic to animal and plant life and are especially effective in inhibiting the growth of gram-negative microorganisms.

DETAILED DESCRIPTION

The novel antibiotic complex provided by this invention is produced by culturing a suitable strain of an actinomycete organism until the culture medium contains substantial antibiotic activity. The antibiotic containing broth thus obtained is comprised of a number of individual factors, each having antibiotic activity. The antibiotic substances can be recovered from the fermentation medium by employing various isolation and purification procedures commonly employed in the art. However, the number and relative abundance of the individual factors isolated from the antibiotic complex will vary according to the method of isolation employed. Purification of the antibiotic complex by a stepwise elution procedure affords an antibiotic complex comprising at least eight factors.

Nebramycin and the individual factors thereof are basic substances capable of forming salts with both inorganic and organic acids. In the free base form, nebramycin is soluble in water and dimethyl sulfoxide, slowly soluble in methanol, and insoluble in most other organic solvents such as acetone, the higher alcohols, dioxane, ethyl acetate, diethyl ether, acetonitrile, methyl isobutyl ketone and hydrocarbon solvents. The free base complex is stable at refrigerated temperatures, room temperature, and 37° C. for at least 8 weeks over a pH range of pH 1 to pH 11.

Figure 1:
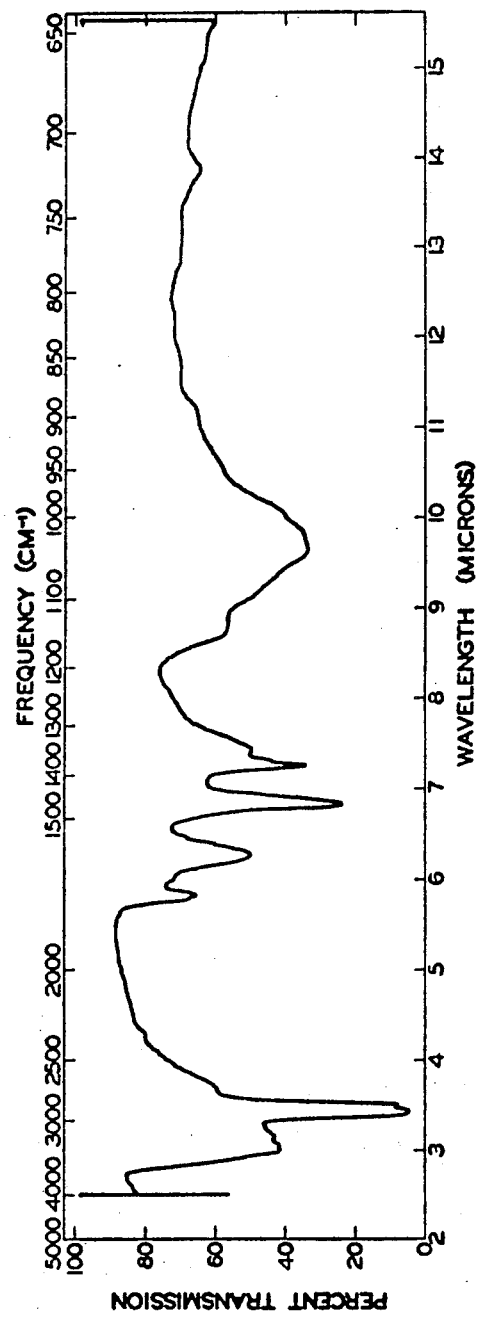

The infrared absorption spectrum for the antibiotic complex, obtained from a mineral oil mull thereof, is shown in FIG. 1. The distinguishable bands in the infrared absorption spectrum over the range of 2–15 microns are as follows: 3.02 (broad), 3.15, 5.82, 6.26, 7.43, 8.8 (broad), and 9.7 (very broad) microns.

In a series of chemical tests carried out with the complex, positive reactions were obtained in the ninhydrin, anthrone, and Elson-Morgan tests. The Lowry protein test yielded a slightly positive reaction. The biuret and Sakaguchi tests were negative.

As noted above, nebramycin can comprise at least eight distinct factors and the term "nebramycin," as used herein, designates a mixture of the factors. The various factors which can be separated from the complex are designated herein as nebramycin I, nebramycin I', nebramycin II, nebramycin III, nebramycin IV, nebramycin V, nebramycin V' and nebramycin VI.

By purification of the complex by the stepwise elution procedure nebramycin I, nebramycin I' and nebramycin III are recovered in such small amounts as to make their isolation and purification unrewarding. Of the remaining nebramycins obtained, the most abundant appear to be nebramycin II, which constitutes about 45–50 percent by weight of the separated factors, and nebramycin V which constitutes about 30 percent by weight of the recovered factors. Nebramycin IV is recovered to the extent of about 15–20 percent, while nebramycin VI and nebramycin V' together constitute less than about 10 percent by weight of the isolated factors.

As previously noted, the number and relative amounts of the factors recovered from the isolated antibiotic complex varies according to the method employed for purification of the complex. Purification by the gradient elution procedure provides three major factors, each having antibiotic activity, nebramycin II, nebramycin IV and nebramycin V'. The remaining antibiotic factors are present in minor amounts.

The more abundant nebramycins referred to above, have been separated and characterized, descriptions of the properties thereof being contained in the following paragraphs.

Nebramycin II is a white crystalline compound. Electrometric titration in water indicates the presence of titratable groups having pK'a values of about 5.7, 6.7, 7.7 and 8.7. The specific rotation of sodium D light at a temperature of 25° C. by nebramycin II is +162.5° when the concentration of the antibiotic is 1 percent on a weight per volume basis in aqueous solution. The apparent molecular weight, as indicated by titration data, is about 541. Microanalysis indicates that nebramycin II has the following approximate elemental composition:

C, 46.47; H, 7.99; N, 13.05; O, 32.29 (direct)

The empirical formula of nebramycin II which best fits these data is $C_{21}H_{43}N_5O_{11}$.

Figure 2:
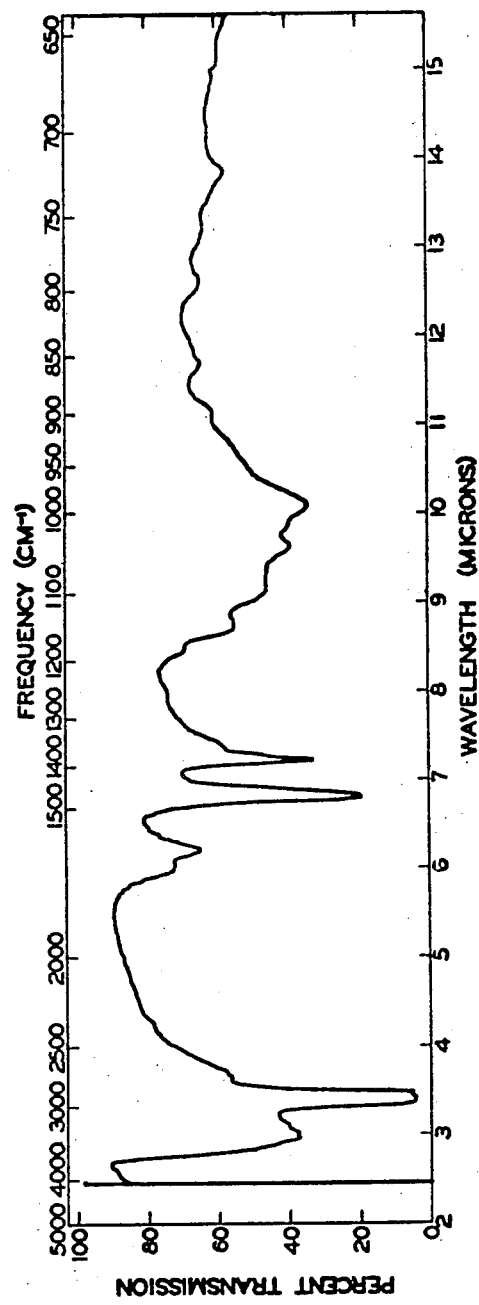

The infrared absorption spectrum of nebramycin II as a mineral oil mull is shown in FIG. 2 of the accompanying drawings. The distinguishable bands in the infrared absorption spectrum over the range of 2–15 microns are as follows: 3.02, 3.14, 6.05, 6.23, 7.4, 8.5, 8.75, 9.17, 9.65, 10.11, 11.15, 11.7, and 12.6 microns.

Nebramycin II forms an acetyl derivative which has a specific rotation, $[\alpha]_D^{25}$, of about +130° when the concentration of the compound is 1 percent on a weight per volume basis in aqueous solution. The derivative has no remaining titratable groups. The elemental composition as determined by microanalysis indicates that four acetyl groups have been added to the nebramycin II structure.

A powder X-ray diffraction pattern of nebramycin II using vanadium-filtered chromium radiation and a wavelength value of 2.2896 A for calculating the interplanar spacings gives the following intensity readings:

| d | I/I₁ | d | I/I₁ |
|---|---|---|---|
| 15.84 | .30 | 3.48 | .30 |
| 10.45 | .90 | 3.45 | .10 |
| 9.82 | 1.00 | 3.29 | .50 |
| 7.95 | .70 | 3.15 | .05 |
| 7.12 | .70 | 3.02 | .10 |
| 5.76 | .40 | 2.99 | .10 |
| 5.27 | .50 | 2.88 | .05 |
| 4.99 | .80 | 2.80 | .08 |
| 4.90 | .40 | 2.67 | .20 |
| 4.71 | .15 | 2.59 | .15 |
| 4.56 | .60 | 2.50 | .05 |
| 4.35 | .70 | 2.43 | .05 |
| 4.24 | .30 | 2.39 | .05 |
| 4.17 | .20 | 2.27 | .10 |
| 3.99 | .05 | 2.12 | .10 |
| 3.92 | .15 | 2.07 | .05 |
| 3.78 | .20 | 1.94 | .02 |
| 3.69 | .15 | 1.89 | .02 |
| 3.60 | .30 | | |

Nebramycin IV is a basic substance with titratable groups having pK'a values of about 5.3, 6.8, 7.8, and 9.0 as indicated by electrometric titration in water. The specific rotation of nebramycin IV, determined upon a 1 percent aqueous solution at a temperature of 25° C. is +114°. Microanalysis indicates the following percentage composition for nebramycin IV:

C, 41.66; H, 7.78, N, 15.02; O, 34.93 (direct).

The apparent molecular weight determined from the titration data is about 478. These data suggest an empirical formula of $C_{16}H_{36}N_5O_{10}$ for nebramycin IV.

Figure 3:
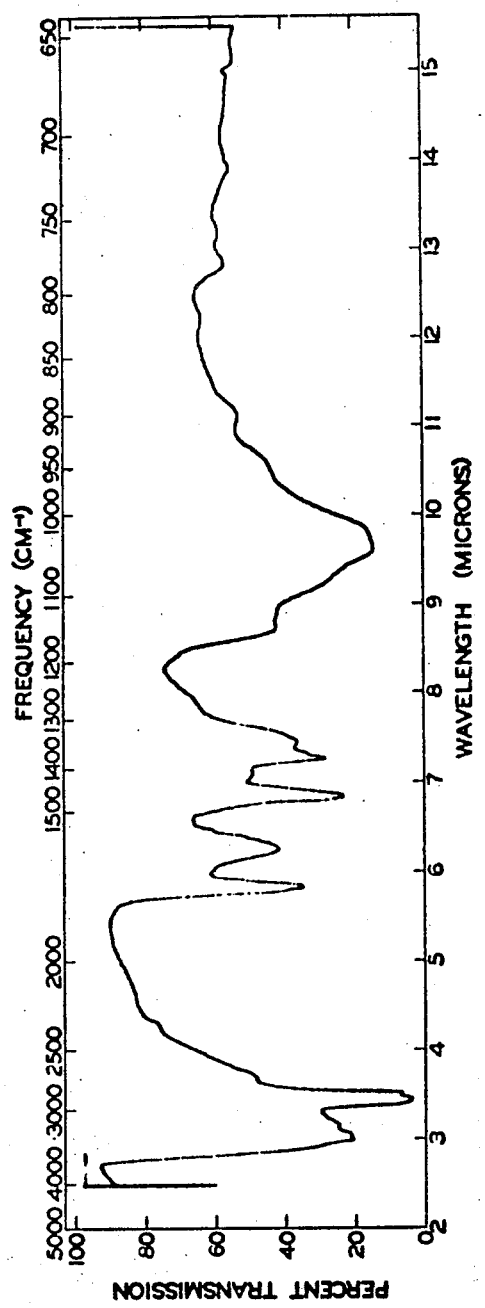

The infrared absorption spectrum of nebramycin IV as a mineral oil mull is shown in FIG. 3 of the drawings. The distinguishable bands in the infrared absorption spectrum over the range of 2–15 microns are as follows: 3.05, 3.17, 5.85, 6.27, 7.46, 8.75, 9.7, 10.5, 11.1, and 12.85 microns.

The tetra-acetyl derivative of nebramycin IV is a crystalline solid melting at about 265°–267° C. The specific rotation, $[\alpha]_D^{25}$, is +109° when the concentration of the derivative is 1 percent in an aqueous solution.

A powder X-ray diffraction pattern of nebramycin IV using vanadium-filtered chromium radiation and a wavelength value of 2.2896 A for calculating the interplanar spacings gives the following intensity readings:

| d | I/I₁ | d | I/I₁ |
|---|---|---|---|
| 17.27 | .50 | 4.32 | .90 |
| 12.27 | .30 | 4.03 | .30 |
| 9.46 | .20 | 3.87 | .70 |
| 8.33¹ | 1.00 | 3.76 | .02 |
| 7.32 | .05 | 3.54 | .05 |
| 6.82 | .05 | 3.39 | .08 |
| 6.66 | .05 | 3.28 | .15 |
| 6.08 | .10 | 3.19 | .02 |
| 5.20 | .20 | 3.01 | .02 |
| 5.03 | .30 | 2.91 | .05 |
| 4.63 | 1.00 | 2.62 | .08 |
| 4.43 | .60 | 2.60 | .10 |
| 2.53 | .08 | 2.31 | .02 |
| 2.50 | .08 | 2.18 | .10 |
| 2.48 | .05 | 2.10 | .05 |
| 2.39 | .05 | | |

¹Possible double line.

Electrometric titration of nebramycin V, a crystalline white compound, shows titratable groups having pK'a values of about 5.5, 7.0, 8.0, and 9.1. The specific rotation of sodium D light by a 1 percent aqueous solution of this factor, determined at a temperature of 25° C., is +118°. The elemental composition as determined by microanalysis is as follows:

C, 41.05; H, 7.60; N, 13.62; O, 36.76 (direct).

The analytical data and the apparent molecular weight of 424 as determined from titration data suggest an empirical formula for nebramycin V of $C_{14}H_{32}N_4O_{10}$.

Figure 4:
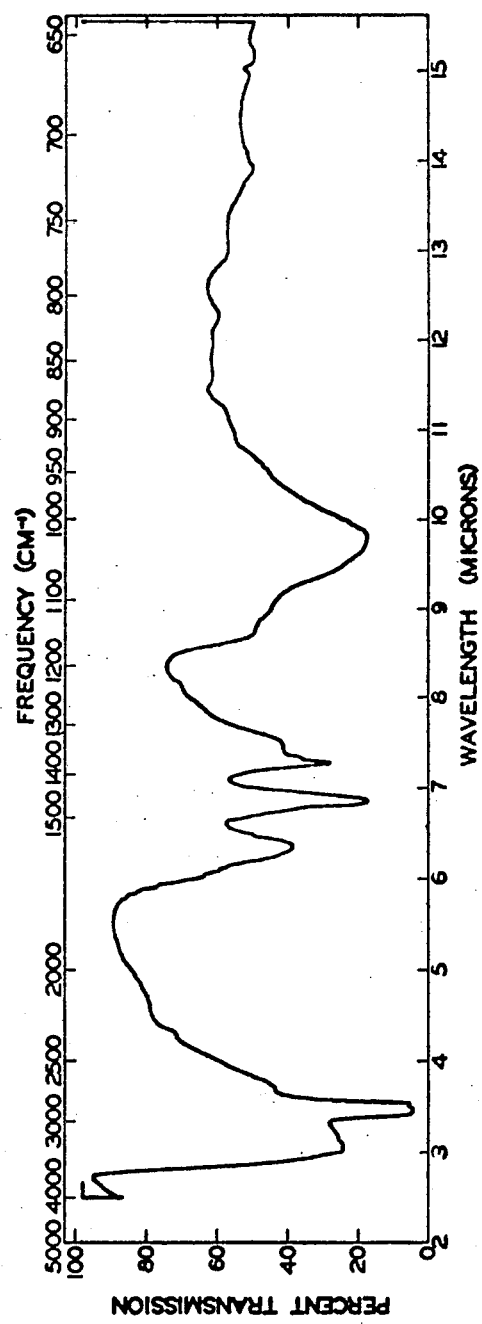

FIG. 4 shows the infrared absorption spectrum of nebramycin V as a mineral oil mull, with distinguishable bands in the range of 2–15 microns as follows: 3.05, 3.19, 6.32, 7.45, 8.75, 9.7, 11.15, and 12.24 microns.

Like nebramycin IV, nebramycin V forms a crystalline tetra-acetyl derivative. The derivative melts with decomposition at about 260° C. and gives a specific rotation, $[\alpha]_D^{25}$, of about +109°, when the concentration of the compound is 0.42 percent in water.

A powder X-ray diffraction pattern of nebramycin V using vanadium-filtered chromium radiation and a wave length of 2.2896 A for calculating the interplanar spacings give the following intensity readings:

| d | I/I$_1$ | d | I/I$_1$ |
|---|---|---|---|
| 12.73 | .50 | 4.42 | .80 |
| 9.00 | .60 | 4.14 | .60 |
| 7.39 | .05 | 3.98 | .60 |
| 6.79 | .80 | 3.76 | .20 |
| 6.34 | .70 | 3.39 | .10 |
| 4.99 | .90 | 3.13 | .05 |
| 4.71 | 1.00 | | |

Nebramycin V' is a crystalline white compound. It is appreciably soluble in ethanol, pyridine, dimethyl formamide and dimethyl sulfoxide and substantially insoluble in the common ketone and ester solvents such as acetone and ethyl acetate. It is also insoluble in hydrocarbon solvents.

Electrometric titration of nebramycin V' shows the presence of five titratable groups having pK'a values of about 5.6, 6.9, 7.7, 8.6 and 9.9. The specific rotation of sodium D light by a 1 percent aqueous solution of nebramycin V', determined at a temperature of 25° C., is +125°. Microanalysis of nebramycin V' gave the following approximate elemental percentage composition:

C, 41.6; H, 7.49; N, 14.9; O, 36.0 (indirect).

The empirical formula which best fits the foregoing data is $C_{19}H_{38}N_6O_{10}\cdot 2\frac{1}{2} H_2O$. The apparent molecular weight is about 510.

Figure 5:
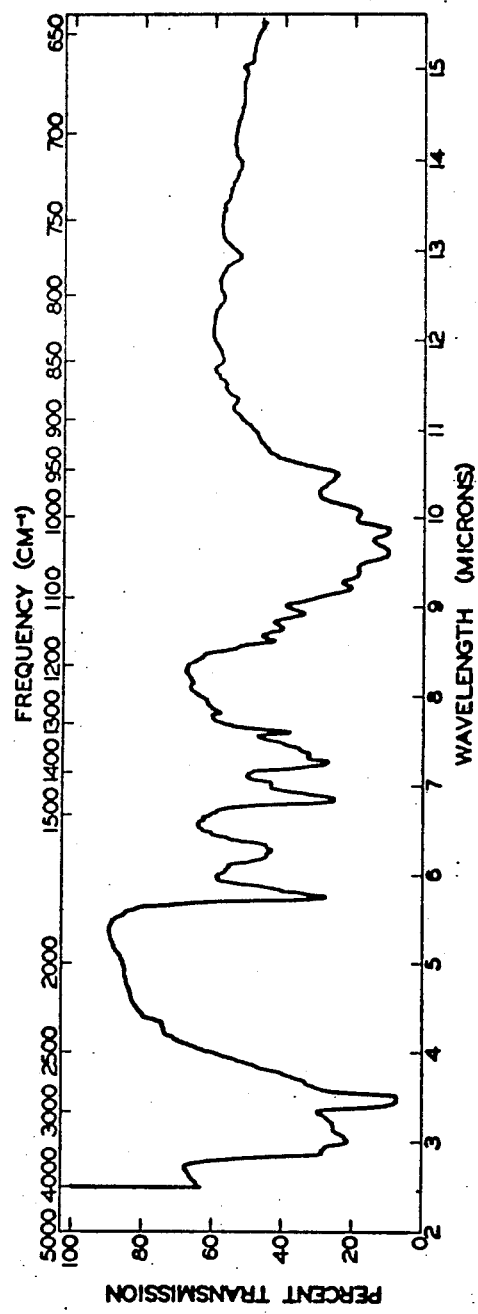

The infrared absorption spectrum of nebramycin V' as a mineral oil mull is shown in FIG. 5 of the drawings. The distinguishable bands in the infrared spectrum over the range of 2–15 microns are as follows: 2.87, 3.00, 3.18, 3.66, 5.75, 5.82, 6.1, 6.23, 6.28, 6.86, 7.03, 7.28, 7.37, 7.42, 7.61, 7.84, 7.95, 8.17, 8.47, 8.55, 8.77, 8.94, 9.23, 9.40, 9.63, 9.87, 10.08, 10.50, 11.36, 11.53, 11.61, 11.8, 12.5, 12.95, 13.46, and 14.0 microns.

Nebramycin V' forms a crystalline penta-acetyl derivative.

A powder X-ray diffraction pattern of nebramycin V' using vanadium-filtered chromium radiation and a wave length value of 2.2896 A for calculating the interplanar spacings gives the following intensities:

| d | I/I$_1$ | d | I/I$_1$ |
|---|---|---|---|
| 16.51 | .90 | 4.24 | .60 |
| 11.47 | .70 | 4.07 | .50 |
| 9.85 | .20 | 3.97 | .50 |
| 9.55 | .10 | 3.81 | .05 |
| 6.88 | .30 | 3.65 | .05 |
| 6.48 | .20 | 3.43 | .05 |
| 4.89 | .70 | 3.06 | .05 |
| 4.74 | 1.00 | 2.99 | .05 |
| 4.33 | .40 | 2.43 | .05 |

Nebramycin VI is a white crystalline compound. Electrometric titration of this factor shows the presence of five titratable groups having pK'a values of 5.8, 6.8, 7.1, 7.9, and 9.3. The specific rotation of sodium D light by a 1 percent aqueous solution of nebramycin VI, determined at 25° C., is +131°.

Elemental analysis of nebramycin VI gave the following percentage elemental composition:

C, 44.3; H, 8.1; N, 14.3; O, 32.8.

The molecular weight of nebramycin VI as determined from the above data is about 467. The empirical formula which best fits the above data is $C_{18}H_{37}N_5O_9\cdot H_2O$.

Figure 6:
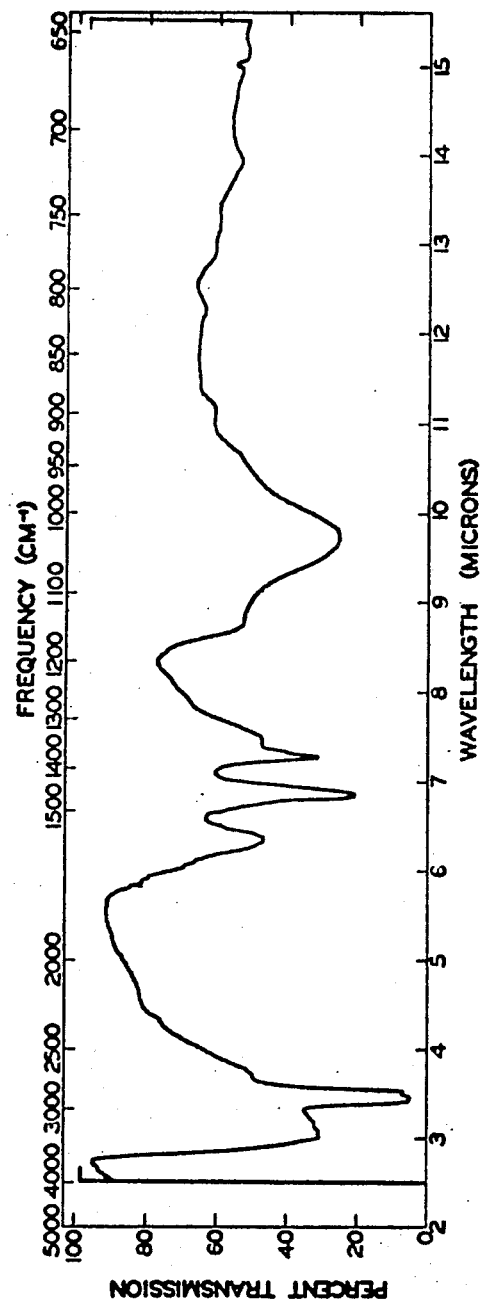

Nebramycin VI, like nebramycin V', forms a crystalline penta-acetyl derivative. FIG. 6 shows the infrared absorption spectrum of nebramycin VI as a mineral oil mull, with bands in the range of 2–15 microns as follows: 3.05, 3.19, 6.35, 7.47, 8.75, 9.8, 12.3 and 12.95 microns.

A powder X-ray diffraction pattern of nebramycin VI using vanadium-filtered chromium radiation and a wave length value of 2.2896 for calculating the interplanar spacings gave the following intensity readings:

| d | I/I$_1$ | d | I/I$_1$ |
|---|---|---|---|
| 17.86 | .30 | 3.87 | .40 |
| 13.47 | .80 | 3.77 | .40 |
| 9.35 | .50 | 3.48 | .20 |
| 9.04 | .50 | 3.37 | .40 |
| 8.46 | .60 | 3.27 | .20 |
| 7.37 | .70 | 3.06 | .20 |
| 7.03 | .40 | 2.94 | .15 |
| 6.48 | .30 | 2.72 | .15 |
| 6.07 | .30 | 2.62 | .15 |
| 5.04 | 1.00 | 2.55 | .10 |
| 4.91 | .60 | 2.50 | .05 |
| 4.79 | .60 | 2.41 | .05 |
| 4.60 | .60 | 2.33 | .10 |
| 4.47 | .70 | 2.26 | .05 |
| 4.32 | .50 | 2.23 | .10 |
| 4.18 | .40 | 2.12 | .10 |
| 4.01 | .40 | 2.04 | .10 |

Acid addition salts of nebramycin or of the separate antibiotic components thereof can be prepared by conventional methods. Either organic or inorganic acids can be employed for salt formation. A convenient method for the preparation of such salts comprises the addition of a solution of the salt-forming acid to an aqueous solution of the antibiotic. In the case of insoluble acid addition salts, the salt precipitates from solution and is readily separated by conventional techniques such as filtration or centrifugation. In the event that the desired acid addition salt does not precipitate readily, the precipitation can be aided, as by concentrating the solution to smaller volume or by adding a water miscible solvent such as acetone or the like. The acid addition salt can be conveniently reconverted to the free base form of the antibiotic by passing an aqueous solution of the salt over an anionic exchange resin in the hydroxyl cycle.

The various individual nebramycin factors can be distinguished from each other and from other antibiotics having similar properties by paper chromatographic and thin layer chromatographic techniques. Thus, for example, chromatography of the complex can be carried out in the conventional descending manner at 73° F. ±1° F. on Whatman No. 1 paper having dimensions of 7 ½ inches by 18 ¼ inches. The results are shown in the following table. The migration constant for each of the antibiotics is expressed as an $R_e$ constant rather than the more conventional $R_f$ value. The $R_e$ value expresses the ratio of the distance traversed by the antibiotic with respect to the end of the tape rather than the solvent front. This method of expressing the constant was chosen in view of the fact that the solvent front had progressed beyond the end of the tape during the time interval employed with most of the solvent systems.

TABLE I

Paper Chromatography of the Nebramycins and Known Antibiotics with Similar Properties

| | Solvent System[1] and $R_e$ Values | | | | | | |
|---|---|---|---|---|---|---|---|
| | A | B | C | D | E | F | G |
| Nebramycin complex | — | — | — | 0.65 | 0.32 | 0 | 0 |
| Nebramycin I | 0.20 | — | — | — | — | — | — |
| Nebramycin I' | — | — | — | — | — | — | — |
| Nebramycin II | 0.40 | 0.17 | 0.32 | — | — | — | — |
| Nebramycin III | 0.40 | 0.34 | 0.41 | — | — | — | — |
| Nebramycin IV | 0.49 | 0.20 | 0.32 | — | — | — | — |
| Nebramycin V | 0.55 | 0.22 | 0.35 | — | — | — | — |
| Nebramycin VI | 0.71 | 0.31 | 0.38 | — | — | — | — |
| Kanamycin | 0.35 | 0.35 | 0.41 | 0.65 | 0.42 | 0 | 0 |
| Kanamycin B | 0.57 | 0.26 | 0.32 | 0.70 | 0.29 | 0 | 0.05 |
| | | 0.51 | 0.39 | | | | |
| Gentamycin | 0.83 | 0.75 | 0.62 | — | 0.51 | 0 | 0.1 |
| | | 0.95 | | | | | |
| Catenulin | 0.44 | 0.25 | 0.34 | 0.65 | 0.35 | 0 | 0 |
| Neomycin | 0.60 | 0.12 | 0.19 | — | — | 0 | 0.05 |

[1]The solvent systems employed and the duration of chromatography are indicated below:

A = n-Butanol saturated with water, plus 2 percent p-toluenesulfonic acid, for 40 hours.
B = 80 percent aqueous ethanol, plus 1.5 percent sodium chloride, for 40 hours on paper buffered with 0.95 M sulfate-bisulfate.
C = Propanol, pyridine, acetic acid and water (15:10:3:12) for 40 hours.
D = Water saturated with methylisobutyl ketone, plus 1 percent p-toluenesulfonic acid, for 6 hours.
E = Propanol and water (1:1), for 24 hours on paper buffered with 0.75 M phosphate, pH 4.0.
F = n-Butanol saturated with water, for 18 hours.
G = n-Butanol saturated with water, plus 2 percent p-toluenesulfonic acid and 2 percent piperidine, for 18 hours.

The chromatographic data shown above indicate that while with any single solvent system several of the factors comprising the nebramycin complex appear to be identical to each other or to other known antibiotics, chromatography with a variety of solvent systems clearly establishes non-identity. These results, considered with other data, such as physical and physicochemical properties, microbiological activities, toxicities, and the like, support the conclusion that the individual factors comprising the nebramycin complex constitutes a series of hitherto unknown antibiotic substances.

Nebramycin V' which is one of the more abundant antibiotic factors obtained by the gradient elution procedure is difficult to identify in the presence of nebramycin V and nebramycin VI by paper chromatographic techniques. The preferred method of distinguishing nebramycin V' from nebramycin V and nebramycin VI is by thin layer chromatography on a silica gel plate employing chloroform, methanol, 28 percent ammonium hydroxide in the ratio of 1—3—2 by volume as the solvent system.

The nebramycin complex and the individual factors comprising the said complex have an inhibitory action against the growth of microorganisms which are pathogenic to animal and plant life. The inhibitory concentrations of the complex and of nebramycin II, nebramycin IV, nebramycin V and nebramycin VI against a number of organisms are shown in Table II. The minimum inhibitory concentrations of nebramycin V' and nebramycin VI against a variety of organisms, both in the presence of and in the absence of horse serum are presented in Table III. Minimum inhibitory concentrations were determined, in each case, by the agar dilution method after 24 hours' incubation.

TABLE II

Test Organism

Minimum Inhibitory Concentration (mcg./ml.)

| | Nebramycin I | Nebramycin II | Nebramycin IV | Nebramycin V | Nebramycin VI |
|---|---|---|---|---|---|
| Staphylococcus aureus 3055 | 6.25 | 6.25 | 6.25 | 6.25 | 3.12 |
| Bacillus subtilis | <1.56 | <1.56 | <1.56 | <1.56 | <1.56 |
| Mycobacterium avium | <1.56 | <1.56 | <1.56 | 6.25 | <1.56 |
| Streptococcus faecalis | 6.25 | 3.12 | <1.56 | 3.12 | 3.12 |
| Lactobacillus casei | 25 | 50 | 25 | 25 | 12.5 |
| Leuconostoc citrovorum | 25 | 50 | 25 | 25 | 12.5 |
| Escherichia coli No. 1 | 25 | 25 | 12.5 | 12.5 | 12.5 |
| Escherichia coli No. 2 | 25 | 50 | 12.5 | 25 | 12.5 |
| Proteus sp. No. 1 | 50 | 100 | 50 | 50 | 25 |
| Proteus sp. No. 2 | 25 | 25 | 12.5 | 25 | 12.5 |
| Pseudomonas sp. No. 2 | 25 | 25 | 100 | 100 | 6.25 |
| Pseudomonas sp. No. 5 | 6.25 | 12.5 | 6.25 | 3.12 | <1.56 |
| Klebsiella-Aerobacter No. 14 | 6.25 | 12.5 | 3.12 | 12.5 | 6.25 |
| Klebsiella-Aerobacter No. 15 | 12.5 | 12.5 | 6.25 | 12.5 | 6.25 |
| Salmonella sp. No. 1 | 25 | 25 | 25 | 25 | 12.5 |
| Vibrio metschnikovii | 12.5 | 12.5 | 12.5 | 6.25 | 6.25 |
| Agrobacterium tumefaciens | 50 | 25 | 25 | 50 | 50 |
| Erwinia amylovora | <1.56 | <1.56 | <1.56 | <1.56 | <1.56 |
| Pseudomonas solanacearum | 25 | 25 | 12.5 | 12.5 | 12.5 |
| Xanthomonas phaseoli | 12.5 | 12.5 | 12.5 | 6.25 | 3.12 |

[1]Minimum inhibitory concentrations for the individual nebramycins were determined with the free bases. The nebramycin complex was employed as a sulfate salt.

TABLE III

| Test Organism | Minimum Inhibitory Concentration (mcg./ml.) | | | |
|---|---|---|---|---|
| | Nebramycin V' | | Nebramycin VI | |
| | A[1] | B[2] | A | B |
| Staphylococcus aureus 3055 | .2 | .2 | .2 | .1 |
| Escherichia coli No. 14 | 1.56 | .4 | .78 | .2 |
| Escherichia coli No. 0127 | 1.56 | .2 | 1.56 | .2 |
| Pseudomonas aeruginosa | 3.13 | 3.13 | 1.56 | 1.56 |
| Pseudomonas sp. No. 17 | 6.25 | 6.25 | 3.13 | 1.56 |
| Pseudomonas sp. No. 25 | 3.13 | 6.25 | 1.56 | 1.56 |
| Klebsiella-Aerobacter No. 1 | .4 | .1 | .2 | .1 |
| Klebsiella-Aeobacter No. 14 | .78 | .2 | .78 | .2 |
| Proteus sp. No. 6 | 3.13 | .78 | 3.13 | .4 |
| Proeteus sp. No. 7 | .78 | .2 | .4 | .1 |
| Proteus sp. No. 9 | 1.56 | .2 | .78 | .2 |
| Salmonella typhosa SA-12 | .78 | .4 | .78 | .2 |
| Salmonella typhimurium | 3.13 | .78 | 3.13 | .78 |
| Salmonella typhosa T-63 | 1.56 | .4 | .78 | .1 |
| Shigella flexnera | 6.25 | .78 | 3.13 | .78 |

[1] Minimum inhibitor concentration in the absence of horse serum.
[2] Minimum inhibitory concentration in the presence of horse serum, the horse serum being incorporated in the agar at a level of 25 percent.

The data in Table III for nebramycin V' and nebramycin VI demonstrate that the nebramycin factors are not substantially bound by serum. Nebramycin V' and nebramycin VI are effective in inhibiting the growth of penicillin G resistant staphylococci. For example, the growth of thirteen penicillin G resistant staphylococci was inhibited at a minimum inhibitory concentration between about < 0.1 to 0.78 mcg./ml. by the in vitro agar dilution method.

As indicated by the above in vitro data the various nebramycins are highly active against a variety of pathogenic microorganisms. The antibiotic complex is also highly active in inhibiting the growth of such microorganisms. Nebramycin can be used as the purified complex as such or the individual nebramycin factors can be isolated and used separately.

Nebramycin II is useful for controlling infections in animals and poultry caused by the organism *Escherichia coli*. For example, nebramycin II when administered subcutaneously at doses of about 10 mg./kg. is effective in presenting the development of air sac lesions in young chicks innoculated directly into the air sac with cultures of *Escherichia coli*.

When incorporated into the diet of chickens infected with *Salmonella typhimurium*, nebramycin II is orally effective at levels of about 100 g./ton of feed in preventing the development of infection. It is also highly effective when injected at doses of about 50 mg./kg. into dayold chicks infected with *Salmonella typhimurium*.

Nebramycin II when administered subcutaneously at doses of about 2 mg./poult to poults infected with an Arizona paracolon is highly effective in controlling the infection.

Nebramycin II is highly effective in controlling the growth of *Erwinia amylovora*, the causative agent of the economically important disease of pear and apple trees known as fire blight. Control is effected by applying to the plants a fine spray or drench of an aqueous solution of nebramycin II at a concentration between about 5 and 50 ppm.

Nebramycin II is also effective in controlling the disease of the decorative aster plant known as aster yellows. Recent published studies indicate strongly that this disease, transmitted by the leaf hopper, is caused by a mycoplasma organism rather than by a virus. Application of an aqueous solution containing nebramycin II at a concentration between about 750 and 1,250 ppm. to the aster plant both before insect infestation and after, prevents the development of the aster yellow disease symptoms. The antibiotic containing solution can be applied as a spray or as a drench. Best results are obtained by foliar spray application prior to insect infestation and again after the insects have started feeding on the plant. However, a single foliar spray applied after leaf hopper infestation is established also provides substantial control of the disease state.

The above detailed data for nebramycin II is representative of the activity of the other nebramycin factors and the nebramycin complex and illustrate the high degree of activity of these antibiotics against both gram-negative and gram-positive organisms.

The acute toxicity of nebramycin and of the relatively more abundant nebramycin factors has been determined in mice. The $LD_{50}$ values for nebramycin sulfate are about 300 mg./kg. when the antibiotic is injected intravenously and about 350 mg./kg. when the drug is administered intraperitoneally. At subcutaneous doses of 750 mg./kg. or oral doses of 5,600 mg./kg. all mice survived. No significant irritation was observed when one eye of each of four rabbits was treated with one drop of a 50 percent aqueous solution of nebramycin sulfate three times daily for 5 days. The $LD_5$ values, expressed as mg./kg. of the free base, for the individual nebramycins administered intravenously to mice are as follows: nebramycin II about 385, nebramycin IV about 220, nebramycin V about 140, nebramycin VI about 120, and nebramycin V' about 99.

Those skilled in the art will recognize that the in vitro data for nebramycin and the factors thereof illustrate the efficacy of these antibiotics in controlling the growth of both gram-negative and gram-positive microorganisms. In particular nebramycin complex and the various factors thereof are highly active against various strains of the gram-negative organisms pseudomonas and proteus. The activity of nebramycin and the nebramycin factors in controlling the growth of penicillin resistant staphylococcus as illustrated by the data for nebramycin V' and nebramycin VI, provides a means of controlling such organisms. For example, an aqueous solution of nebramycin can be employed to cleanse hospital equipment, particularly surgical implements and interior surfaces, such as furniture and wall surfaces of isolation wards, where the penicillin resistant organisms are known to occur.

The novel antibiotic complex of this invention is produced by culturing a suitable strain of an actinomycete organism under aerobic conditions in a suitable culture medium until substantial antibiotic activity is imparted to the culture medium. The nebramycin can be recovered by employing various isolation and purification procedures known in the art. As previously noted, however, the number and relative proportions of antibiotic factors comprising the isolated complex can vary with the isolation method employed.

Because of the uncertainty of taxonomic studies with the Streptomyces group of organisms, there is always an element of doubt associated with the classification of a newly discovered organism. However, as nearly as can be determined, the organism which produces the antibiotic complex provided by this invention does not sufficiently resemble any of the streptomyces species described by Waksman in *The Actinomycetes*, Vol. II, The Williams and Wilkens Company (1961), to warrant cultural comparisons. The organism therefore is described and characterized as a new species.

The organism producing the antibiotic complex is a spiral-forming, thermo-durant, aerobic to microaerophilic Streptomyces with oblong smooth-walled spores. It is unique in being inhibited by relatively low intensities of artificial light. Because of the latter property, the new species name *Streptomyces tenebrarius sp. n.* has been selected for this organism.

The organism was isolated from a soil sample by suspending portions of the soil sample in sterile distilled water and streaking the suspensions on nutrient agar. The seeded nutrient agar plates were incubated at 25°–35 C. until growth was secured. At the end of the incubation period, colonies of the antibiotic-producing organisms were transferred with a sterile platinum loop to agar slants. The agar slants were then incubated to provide suitable quantities of inoculum for the production of the antibiotic. The strain of the organism employed for the production of the antibiotic complex has been placed on permanent deposit without restrictions with the American Type Culture Collection at Washington, D.C. and has been assigned the culture No. ATCC 17920. The said strain produces all factors of the antibiotic complex, but under the preferred fermentation conditions, nebramycins II, IV, V, V', and VI predominate.

The methods employed in the taxonomic studies of *S. tenebrarius* ATCC 17920 are those commonly used in the taxonomy of actinomycetes. Cultural characteristics were observed after 14 days' incubation. Morphology was determined on Czapek's peptone agar and Bennett's agar during 2 to 7 days' incubation. Action on milk and the reduction of nitrate were observed at 7 and 14 days, hydrogen sulfide production at 24 and 48 hours, and carbon utilization at 10 days. Unless otherwise noted, the cultures were incubated at 37° C. Carbon utilization tests were carried out according to the method described by Pridham and Gottlieb, *J. Bact.*, 56, 107 (1948).

The results of the taxonomic studies are summarized in the paragraphs which follow. The figures in parentheses refer to color blocks in Maerz and Paul, *Dictionary of Color*, McGraw Book Company, (1950). The colors represented by the color blocks have been translated into the ISCC-NBS color names as found in Circular 553, U.S. Department of Commerce, National Bureau of Standards, 1955.

*Microscopic Morphology, Cultural Characteristics and Physiology of S. tenebrarius ATCC 17920*

Morphology—On Czapek's-peptone agar, branching spore forms are formed in random clusters on the aerial mycelium. Isolated spores are rare. The intact aerial mycelium is easily detached from the substrate. Mature spore chains usually form five to six open spirals. Spores are oblong to cylindrical. When observed with the aid of the electron microscope the spores appear smooth and measure 0.7 to 1.3 by 2.0 to 2.1 microns. Sclerotia were observed on Bennett's medium.

Colony characteristics on:

Czapek's agar—Amount of growth sparse; aerial mycelium sparse, pale orange-yellow (11–A2); sporulation fair; reverse pale orange-yellow (11–A2bv); soluble pigment slight pink (1–B1).

Czapek's peptone—Growth abundant; aerial mycelium abundant, light yellowish brown with white areas (11–A4); sporulation abundant; reverse light grayish red (4–H1); soluble pigment grayish pink (4–B1).

Calcium malate agar—Growth moderate, aerial mycelium moderate, pale orange-yellow (11–A2); sporulation moderate; reverse grayish pink (4–D1a); soluble pigment grayish pink (4–B1).

Tyrosine agar—Growth scant, aerial mycelium scant, pale orange-yellow (9–B2); scant sporulation; reverse pale orange-yellow (10–B3); no soluble pigment.

Inorganic salts-starch agar—Growth moderate, aerial mycelium moderate, brownish pink with white areas (11–A4); sporulation abundant; reverse pale yellow (11–B2); soluble pigment pale yellow (11–B2).

Glucose-asparagine agar—Growth moderate, aerial mycelium moderate, pale yellow (9–D2) with white areas (10–A1); moderate sporulation; reverse pale yellow (11–B2); no soluble pigment.

Tomato paste-oatmeal—Growth abundant, aerial mycelium abundant, light yellowish brown (12–B5); abundant sporulation; reverse dark grayish reddish brown (48–J2); soluble pigment dark purplish red (47–H1).

Yeast extract—Abundant growth, abundant aerial mycelium, pale orange-yellow (11–A2) with white areas; abundant sporulation; reverse moderate yellow (11–J6); no soluble pigment.

Nutrient agar—Growth sparse, sparse white (10–A1) aerial mycelium; sparse sporulation; reverse grayish greenish yellow (12–I2); no soluble pigment.

Bennett's agar—Growth moderate, moderate white (10–A1 to 10–B1) aerial mycelium; moderate sporulation; reverse pale yellow (11–C2b); no soluble pigment.

Action on milk—Heavy yellow ring of growth on surface. Coagulation and peptonization observed.

Nitrate reduction—Positive.

$H_2S$ production—Negative.

Nutrient gelatin—Complete liquefaction after 14 days.

Temperature requirements on Czapek's peptone agar:
20°—No growth.
26°—Fair growth, no aerial mycelium.
30°—Growth and aerial mycelium moderate but no sporulation.
37°—Growth, aerial mycelium and sporulation all abundant.
43°—Growth, aerial mycelium and sporulation all abundant.
50°—Growth, aerial mycelium and sporulation all abundant.
55°—Scant growth.
60°—No growth.

Thermal death point—Spores from a spore suspension heated to 75° C. for 15 minutes remain viable. When the spore suspension was heated to 100° C. for 15 minutes, no spores were viable.

Oxygen tension—Growth is either aerobic or microaerophilic in stab cultures.

Effect of ferric ion—A red soluble pigment is produced only in the presence of ferric ion and the intensity of pigmentation is proportional to the concentration of ferric ion within a given range.

Effect of hydrogen ion concentration, observed on Czapek's peptone agar—No growth below pH 5.0; from pH 5.0 to 6.0 growth and aerial mycelium are fair. Growth and sporulation are abundant at pH 7.0; from pH 8.0 to 8.6 growth and aerial mycelium are fair. The soluble pigment is most intense at pH 5.0 to 6.0 and is slight to absent from pH 6.5 to 8.6.

Reaction to light, observed on Czapek's agar—Growth and sporulation are abundant in the dark. When plate cultures are incubated 15 inches from a 15 watt standard cool white fluorescent light source, growth is sparse and aerial mycelium is absent. Growth and aerial mycelium are moderate when the plate cultures are incubated 15 inches from a 60 watt frosted tungsten lightbulb.

In the table summarizing the results of the carbon utilization test carried out with S. tenebrarius ATCC 17920, the symbols employed are interpreted as follows:

+ = positive
(+) = probable
(−) = questionable
− = none

TABLE IV

Carbon Utilization by S. tenebrarius Strain ATCC 17920

| Carbon Source | Response | Carbon Source | Response |
|---|---|---|---|
| L(+) Arabinose | − | D(+) Trehalose | + |
| L(+) Rhamnose | −. | L(+) Raffinose | − |
| D(−) Ribose | + | Cellulose | − |
| D(+) Xylose | − | Inulin | (−) |
| D(−) Fructose | + | i-Inositol | + |
| D(+) Mannose | + | Mannitol | − |
| D(+) Glucose | + | d-Sorbitol | (−) |
| Lactose | (−) | Salicin | (+) |
| Maltose | + | control (no carbon) | (−) |

S. tenebrarius ATCC 17920 produces, in addition to nebramycin, the known antifungal antibiotic caerulomycin, which is also produced by Streptomyces caerulius [Can. J. Microbiol., 5, 317 (1959)]. Investigation of a culture of the latter organism revealed that it does not produce nebramycin under the conditions described for its culture, nor can it be induced to do so under varied conditions.

A second strain of the new species Streptomyces tenebrarius sp. n., which strain produces only three of the factors of the antibiotic complex, has also been isolated and characterized. This strain of s. tenebrarius, which produces only nebramycin I, I′, and II, has been assigned the ATCC accession number ATCC 17921. Strain ATCC 17921 differs from strain ATCC 17920 principally in that it fails to produce an aerial mycelium or spores, and on most media it produces no soluble pigment. The characterization data for this strain of the organism is summarized in the paragraphs which follow. The methods employed in the taxonomic studies of S. tenebrarius ATCC 17921 are the same as those referred to above in the description of the characterization of S. tenebrarius ATCC 17920, and the symbols employed have the same significance as above.

Microscopic Morphology, Cultural Characteristics and Physiology of S. tenebrarius ATCC 17921

Morphology—Neither aerial mycelium nor spores are present; the vegetative mycelium fragments in slide mounts.

Colony characteristics on:

Czapek's agar—Vegetative growth fair, yellowish white (9–B1); no aerial mycelium; no soluble pigment.

Czapek's peptone—Vegetative growth abundant, grayish yellow (12–B3); no aerial mycelium; slight brownish soluble pigment.

Calcium malate agar—Vegetative growth moderate, grayish yellow (12–B2); no aerial mycelium; slight grayish brown soluble pigment.

Tyrosine agar—Vegetative growth moderate, grayish yellow (11–B2); neither aerial mycelium nor soluble pigment produced.

Inorganic salts-starch agar—Vegetative mycelium fair, light yellow-brown (13–C6); no aerial mycelium; light brown soluble pigment.

Glucose-asparagine agar—Vegetative growth moderate, grayish yellow (11–D2); no aerial mycelium or soluble pigment.

Tomato paste-oatmeal—Vegetative mycelium moderate, pale yellow (10–B2); no aerial mycelium or soluble pigment.

Yeast extract—Vegetative mycelium moderate, light yellow-brown (12–E5); no aerial mycelium or soluble pigment.

Nutrient agar—Vegetative growth moderate, light yellow (9–K4); no aerial mycelium or soluble pigment.

Bennett's agar—Vegetative growth moderate, grayish yellow (12–E4); no aerial mycelium or soluble pigment.

Action on milk—Buff colored ring of growth on surface. Coagulation and peptonization observed.

Nitrate reduction—Positive.

$H_2S$ production—Negative.

Nutrient gelatin—Complete liquefaction in 7 days.

Oxygen tension—Growth is either aerobic or microaerophilic in stab cultures.

Temperature requirements on Bennett's medium—Growth is moderate at 26°, 30°, 43°, 49°, and 55° C. and is most abundant at 37° C.; no growth occurs at 60° C. The vegetative mycelium is pale yellow-brown at and below 37° C. and is slightly reddish brown at and above 43° C. Neither aerial mycelium no soluble pigment are observed at any temperature.

TABLE V

Carbon Utilization by S. tenebrarius Strain ATCC 17921

| Carbon Source | Response | Carbon Source | Response |
|---|---|---|---|
| L(+) Arabinose | − | Sucrose | (−) |
| L(+) Rhamnose | − | Trehalose | (+) |
| D(−) Ribose | + | Raffinose | − |
| D(+) Xylose | (−) | Cellulose | − |
| D(−) Fructose | + | i-Inositol | + |
| D(+) Mannose | (+) | Mannitol | (−) |
| D(+) Glucose | + | d-Sorbitol | (−) |
| Lactose | − | Salicin | (−) |
| Maltose | + | Control (minus carbon) | − |

Although this invention is described in detail with particular reference to the newly found organisms S. tenebrarius ATCC 17920 and ATCC 17921, it is to be understood that the production of the nebramycin complex or of the various factors comprising the said complex by other strains or mutants of the said organisms are within the scope of this invention. The proportions of the various nebramycin factors produced by such other strains or mutants would not necessarily be the same as herein indicated. Such other strain or mutants can be produced or obtained by known procedures, for example by subjecting a nebramycin-producing organism to X-ray or ultraviolet irradiation or to chemical agents such as, for example, the nitrogen mustards.

The culture medium employable in the production of nebramycin can be any one of several media since, as is apparent from the above-described utilization tests, the organisms producing nebramycin are capable of utilizing a variety of energy sources. However, for economy of production, maximum yield of antibiotic, and ease of isolation, certain culture media containing relatively simple nutrient sources are preferable. For example, the media which are useful in the production of nebramycin include an assimilable source of carbon such as glucose, fructose, mannose, maltose, starch, and the like. A highly preferred source of carbon is glucose. In addition, the employable media include a source of assimilable nitrogen, such as peptones, hydrolyzed casein, yeast, amino acids, and the like. Presently preferred sources of nitrogen are peptones, hydrolyzed casein and glutamine.

Mineral salts, for example those providing calcium, magnesium, sodium, potassium, chloride, sulfate, phosphate, and carbonate ions can be incorporated in the media with beneficial results, although an excess of phosphate should be avoided since it appears to depress yields of the antibiotic. A source of growth factors such as yeast or yeast extract can also be beneficially included in the medium.

As is necessary for the growth and development of other microorganisms, essential trace elements should also be included in the culture medium for growing the organisms employed in this invention. Such trace elements are commonly present as impurities incidental to the addition of other constituents of the medium.

Submerged aerobic culture conditions are the conditions of choice for the production of nebramycin. For preparation of relatively small amounts, shake flasks and surface culture can be employed, but for the preparation of large amounts, submerged aerobic culture in sterile tanks is preferred. The medium in the sterile tank can be inoculated with a sporulated suspension, but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism and, when a young active vegetative inoculum has been obtained, to transfer the vegetative inoculum aseptically to the large tank. Suitably, an aliquot of the vegetative inoculum, equal to about 4 percent of the volume of the medium into which the inoculum is induced, is employed. The fermentation medium in which the vegetative inoculum is produced can be either the same as or different from the medium utilized for the large scale production of nebramycin.

As is evident from the above detailed temperature requirements for the organism, the organism will grow over a relatively wide range of temperatures. However, the organisms appear to grow best at temperatures in the range of about 30° to 50° C. Optimal production of nebramycin appears to occur at a temperature of about 37° to 43° C. The organism which produce nebramycin are sensitive to light and do not grow well in the presence thereof. Accordingly, fermentations employing the organisms are desirably carried out in the absence of visible light.

In accord with the customary practice in aerobic submerged culture processes, sterile air is blown through the culture medium. For efficient growth of the organisms and nebramycin production the volume of air employed in the tank production of nebramycin is upwards of 0.1 volume of air per minute per volume of culture medium, and is preferably substantially higher. Efficient growth of the organisms and optimal yields of nebramycin are obtained when the volume of air employed is at least one volume of air per minute per volume of culture medium.

The concentration of nebramycin activity in the fermentation medium can readily be followed during the course of the fermentation by testing samples of the culture medium for their inhibitory activity against the growth of organisms known to be inhibited in the presence of nebramycin. Two of the organisms so employed in following the production of nebramycin are *Klebsiella pneumoniae* and *Mycobacterium butyricum*. The former organism is generally employed in the well-known turbidimetric technique, while the latter is utilized in the cup plate method.

In general, maximum production of the antibiotic occurs within about 4 to 7 days after inoculation of the culture medium when submerged aerobic culture or shake flask culture is employed and within a somewhat longer time when surface culture is used.

The mycelium and undissolved residues are removed from the fermentation broth by conventional means such as filtration or centrifugation. The antibiotic activity is contained in the filtered broth and can be recovered therefrom by employing adsorption techniques. The adsorbents which can be employed most advantageously are the cation exchange resins, for example those of the type available commercially under the trademark "IRC-50."

In general, the procedure for recovering nebramycin from the fermentation broth is as follows. The whole broth is filtered with the help of a filter aid after the pH of the mixture has been lowered to about pH 2 by the addition of an acid, such as sulfuric acid, phosphoric acid, hydrochloric acid, and the like. The pH of the filtrate is adjusted to about pH 5.5 by the addition of a concentrated base and the mixture is again filtered. The filtrate is passed through an ion exchange column packed with a resin such as IRC-50 in the ammonium cycle. The column is then washed with distilled water and the antibiotic activity is eluted with dilute acid. The fractions containing the antibiotic activity are pooled and concentrated to about one-twentieth of the original volume. The pH of the concentrate is raised to about pH 11 by the addition of concentrated base and the basic concentrate is poured into about 6 volumes of acetone, mixed well and chilled. The microbiologically inactive precipitate which separates is removed by filtration. The pH of the filtrate is lowered to about pH 3.5 by the addition of 20 percent sulfuric acid with thorough mixing. The nebramycin complex is precipitated in the form of the sulfate salt, while the caerulomycin which is coproduced in the fermentation remains in the supernatant layer which is discarded. The nebramycin sulfate is dissolved in a minimum quantity of water and the aqueous solution is passed through a Dowex 1 × 1 column. The aqueous solution of nebramycin sulfate is followed on the column with distilled water and the effluent from the column is collected in fractions. The active fractions are pooled and concentrated to a heavy syrup and are then dried to yield the free base form of nebramycin.

Alternatively, the antibiotic can be recovered from the filtered fermentation broth by precipitation of the complex in the form of its insoluble salts formed with suitable acids. Acids which are especially suitable for forming the insoluble salts of the antibiotic complex are selected from among the $C_{10}$–$C_{18}$ alkylsulfonic acids, such as dodecylsulfonic acid, octadecylsulfonic acid and the like, the $C_{10}$–$C_{18}$ alkylbenzenesulfonic acids, such as dodecylbenzenesulfonic acid, tetradecylbenzenesulfonic acid and the like, and the $C_{10}$–$C_{18}$ alkylsulfoacetates such as dodecylsulfoacetate, undecylsulfoacetate and the like. An especially preferred acid for forming the desired insoluble salt of the nebramycin complex obtained by this procedure is dodecylsulfoacetate. More specifically, the alternative procedure for recovering the antibiotic is as follows. The filtered antibiotic broth is adjusted to pH 5.5 and refiltered. Addition of sodium dodecylsulfoacetate with stirring causes precipitation of the nebramycin complex as the dodecylsulfoacetate insoluble salt. The salt is filtered and washed with water and acetone and dried. The antibiotic complex thus obtained can be converted to the free base form by treatment with a weak base.

The insoluble salts of the nebramycin complex obtained in the above procedure are themselves valuable antibiotic substances. For example, the insoluble salt formed with dodecylsulfonic acid has the same in vitro antibiotic spectrum as the free base form of the complex or the sulfate salt.

If desired, the individual nebramycin factors can be obtained as separate substances by further treatment of the antibiotic complex. As already noted, the number of individual factors and the relative proportions thereof depend upon the separation procedure employed. In one such procedure the nebramycin complex can be passed over an ion exchange column, suitably in the form of an acid addition salt of the complex, for example the sulfate. Typically a solution of nebramycin sulfate is conveniently obtained by preparing a 20 percent aqueous solution of nebramycin and adjusting the pH of the solution to about pH 4.5 by the addition of sulfuric acid. Colored impurities can be removed by stirring the solution thus prepared with about 5 percent (weight/volume) of an activated carbon such as, for example, Darco G–60. Effective decolorization is usually obtained by stirring the mixture containing the carbon for about one hour. The mixture is then filtered and the filtrate which contains the nebramycin sulfate is loaded onto a column packed with IRC–50 in the ammonium cycle. The column is washed with water and the individual antibiotics comprising the nebramycin complex are fractionally eluted with 0.1 N ammonium hydroxide. Generally speaking, the elution is accomplished extremely slowly and a very large number of fractions is usually necessary in order to effect fractionation of the complex. Thus, for example, the complete fractionation of about 250 g. of nebramycin requires about 700 fractions, each comprising about 900 ml. of eluate.

The first active fractions obtained contain nebramycins I, I', and II. These are followed by a series of active fractions in which nebramycin II is the only antibiotic present. A number of inactive fractions follow the elution of nebramycin II before the fractions containing nebramycin IV are eluted. The first fractions containing nebramycin IV appear to contain traces of nebramycin III. Nebramycin V and nebramycin V' are obtained from the column in the active fractions which follow nebramycin IV. In order to obtain nebramycin VI, the column is further eluted with a more concentrated ammonium hydroxide solution after all of the nebramycin V and nebramycin V' have been recovered from the column. A suitable eluate for the removal of nebramycin VI is 0.3 N ammonium hydroxide. This procedure is referred to herein as the stepwise elution procedure.

An alternative procedure for obtaining the individual factors as separate substances is that which has been referred to above as the gradient elution procedure. In this procedure, the antibiotic complex, as the free base or in salt form, is loaded onto a column packed with a cation exchange resin of the IRC–50 type in the ammonium cycle. The column is first washed with water and is then eluted with ammonium hydroxide by a gradient elution technique such as the following: A 0.3 N ammonium hydroxide solution is fed from a connecting open reservoir to a closed mixing chamber containing 0.05 N ammonium hydroxide which, in turn, feeds onto the column. As the contents of the closed chamber are discharged onto the column, the normality of the ammonium hydroxide in the mixing chamber gradually increases. Generally, a large number of fractions must be collected in order to effect isolation of each of the separate factors. Thus, for example, the complete fractionation of a two kilogram load of the nebramycin complex as the alkylsulfoacetate salt requires about 190 fractions, each comprising about 500 ml. of eluant. The eluant fractions are assayed for antibiotic activity or chromatographed on silica gel thin layer plates to identify the antibiotic factors present therein.

The first fractions collected contain antibiotic factors occurring as minor constituents of the complex. These are followed by a large number of fractions containing only nebramycin II, the major component of the isolated complex. Another series of fractions containing minor antibiotic factors intervenes before the fractions containing nebramycin IV are collected. The final eluant fractions collected contain only nebramycin V'.

The gradient elution procedure is the preferred method for obtaining nebramycin II and nebramycin V' as individual factors.

The following examples more fully illustrate the practice of this invention.

EXAMPLE 1

Preparation of Nebramycin

A sporulated culture of *S. tenebrarius* ATCC 17920 is produced by growing the organism on a modified Bennett's agar slant medium having the following composition:

| | |
|---|---|
| Dextrine | 10 g. |
| Yeast extract (Difco) | 1 g. |
| Hydrolyzed casein (NZ-Amine A, sold by Sheffield Farms) | 2 g. |
| Beef extract (Difco) | 1 g. |
| $CoCl_2·H_2O$ | 0.01 g. |
| Washed agar | 20 g. |
| Deionized water, q.s. to | 1000 ml. |

The pH of the medium is adjusted to pH 7 before autoclaving.

The slant is inoculated with spores of *S. tenebrarius* ATCC 17920 and is incubated in the absence of visible light for 5 days at 37° C. The culture growth on the slant is covered with water and the slant is scraped gently to remove the spores to provide an aqueous spore suspension.

The spore suspension so obtained is employed to inoculate 800 ml. of a medium having the following composition:

| | |
|---|---|
| Dextrose | 0.05% |
| Nutrisoy flour (Sold by Archer-Daniels-Midland Company—contains 35–45 percent of dispersible protein) | 1.5% |
| Dextrin 700 (A low chloride potato dextrin made by the Morningstar-Paisley Company) | 1% |
| Potassium chloride | 0.1% |
| NZ-Amine A | t0.3% |
| $KH_2PO_4$ | 0.5% |
| $MgSO_4·7H_2O$ | 0.5% |
| $CaCl_2·2H_2O$ | 0.025% |
| Deionized water | |

The inoculated vegetative medium is incubated at about 37° C. for 16 hours on a rotary shaker operating at 250 rpm. and having a 2 ½ inch throw.

A 50-ml. portion of the Vegetative culture is employed to inoculate a 44-liter seed tank containing an aqueous medium having the following composition:

| | |
|---|---|
| Dextrose | 1% |
| Soybean grits | 1.5% |
| $KH_2PO_4$ | 0.05% |
| $MgSO_4$ | 0.5% |
| KCl | 0.1% |
| $CaCl_2·2H_2O$ | 0.025% |
| Antifoam agent | 0.025% |

The seed tank medium is sterilized at 120° C. for about 30 minutes. The inoculated seed tank medium is incubated aT 37° C. for 12 hours. Stirring at a speed of 370 rpm. is begun immediately after inoculation and aeration at the rate of 0.8 cubic feet per minute is maintained throughout the incubation period. At the end of the incubation period the contents of the seed tank are utilized to inoculate a 250 gallon fermentor containing a medium having the following composition:

| | |
|---|---|
| Dextrose | 4% |
| Refined soybean oil | 3% |
| Soybean flour | 3% |
| $NH_4Cl$ | 0.5% |
| $CaCl_2$ | 0.3% |
| $MgSO_4$ | 0.2% |
| $NH_4NO_3$ | 0.1% |
| NZ-Amine A | 0.5% |
| Antifoam agent | 0.2% |
| Deionized water | |

Prior to inoculation, the fermentation medium is sterilized for 30 minutes at 120° C. The fermentation is carried out at 37° C. with aeration at the rate of 17 cubic feet per minute throughout the period from inoculation to harvest. Stirring is begun at 125 rpm. and is increased to 180 rpm. after 12 hours. The fermentation is continued for 5 days.

The fermented culture broth is filtered to remove the mycelium and other undissolved solids. The filtered broth contains nebramycin at a concentration of about 680 units per milliliter.

EXAMPLE 2

Preparation of Nebramycis I, I' and II

The procedure described in Example 1 is followed using *S. tenebrarius* ATCC 17921 as the antibiotic-producing organism. The filtered fermentation broth so obtained contains predominantly nebramycin II with minor proportions of nebramycins I and I'.

EXAMPLE 3

Isolation of Nebramycin Complex

The pH of 880 liters of antibiotic fermentation broth, obtained as described in Example 1, is lowered to about pH 2 by the addition of about 10–15 liters of 20 percent aqueous sulfuric acid. After 45 kg. of a commercial filter aid are added to the acidified broth, the mixture is mixed thoroughly and filtered. The filter cake is washed with water and the wash solution is added to the filtrate.

The pH of the filtrate is adjusted to pH 5.5 by the addition of 50 percent aqueous sodium hydroxide. About 4 kg. of a commercial filter aid are added and the mixture is stirred thoroughly and filtered. The filtrate is passed through an IRC–50 column having dimensions of 4 inches by 6 feet. The column is packed with the resin in the ammonium cycle to a bed height of 44 to 45 inches. After all of the filtrate has passed through the column, the column is washed with about 200 liters of distilled water. The antibiotic activity is then eluted over a period of about 12 to 15 hours with about 150 to 175 liters of 0.1 N sulfuric acid, the eluate being collected in 10-liter fractions. Antibiotic activity becomes detectable in the eluate when the pH thereof decreases to about pH 4 or slightly lower. As the elution progresses, the pH of the eluate continues to drop until it reaches a level of about pH 1.5. The fractions containing antibiotic activity are pooled and concentrated under reduced pressure to about one-twentieth of the original volume.

The pH of the concentrated eluate is adjusted to pH 11 by the addition of 50 percent aqueous sodium hydroxide and the basic concentrate is then added to about six volumes of acetone. The mixture is chilled and set aside in order to permit a precipitate devoid of antibiotic activity to separate. The mixture is filtered and the filter cake containing inactive precipitate is washed with water and discarded.

The pH of the filtrate is adjusted to pH 3.5 by the addition, with thorough mixing, of 20 percent aqueous sulfuric acid. The nebramycin complex precipitates as the sulfate during this treatment and is substantially completely precipitated when the pH of the solution reaches about pH 4 or slightly less. The mixture is filtered and the filtrate, containing the caerulomycin which was coproduced in the fermentation, is discarded.

The filter cake comprising the nebramycin sulfate is dissolved in a minimum quantity of water and chilled. Any solids which do not dissolve readily are discarded, as are any solids which precipitate or crystallize during the chilling. The clear solution of nebramycin sulfate is passed over a 4-inch by 7-foot bed of Dowex 1 × 1 resin

EXAMPLE 4

Separation of the Nebramycin Factors by Stepwise Elution

Nebramycin sulfate is obtained by adjusting the pH of a 20 percent aqueous solution containing 258 g. of the nebramycin complex in free base form to pH 4.5 by the addition of concentrated sulfuric acid. The solution of nebramycin sulfate so prepared is decolorized by stirring for about one hour with 5 percent (Weight/volume) of Darco G–60. The solution is filtered and the filtrate is passed through a 9 × 105 cm. column packed with about 7 liters of IRC–50 resin in the ammonium cycle. After the filtrate containing the antibiotic salt has passed through the column, the column is washed with about 17 liters of deionized water. Elution of the antibiotic activity retained by the column is begun with 0.1 N ammonium hydroxide solution at a flow rate of about 20 ml. per minute. The eluate is collected in fractions of about 900 ml. and each fraction is assayed for microbiological activity. The fractions containing the same antibiotic factor are pooled and lyophilized to obtain the individual dried nebramycins. The individual nebramycins are distributed among the active fractions as follows:

| Fraction | Antibiotic Present |
|---|---|
| 1–34 | Inactive |
| 35–53 | Nebramycin I, I' and II |
| 54–77 | Nebramycin II |
| 78–153 | Inactive |
| 154–172 | Nebramycin IV with a trace of Nebramycin III |
| 173–249 | Nebramycin IV |
| 250–256 | Inactive |
| 257–634 | Nebramycin V with minor amount of Nebramycin V' |
| 635–668 [1] | Inactive |
| 669–698 | Nebramycin VI with a trace of Nebramycin V' |

[1] At this point the eluate is changed to 0.3 N ammonium hydroxide.

EXAMPLE 5

Alternate Isolation of Nebramycin Complex

Two-hundred and fifty gallons of antibiotic fermentation broth at pH 7, obtained as described in Example 1, are filtered with the aid of a commercial filter aid to remove mycelium and other undissolved solids, and the pH of the filtered broth is adjusted to pH 5.5 by addition of 20 percent aqueous sulfuric acid. Sodium dodecylsulfoacetate is added to the acidified broth thus obtained in an amount equal to about 1 g. per 100,000 units of activity. The insoluble nebramycin complex dodecylsulfoacetate salt is thereby precipitated. The sodium dodecylsulfoacetate employed is the commercial product, Lathanol (sodium laurylsulfoacetate) available from the Industrial Chemical Division of Allied Chemical Corp. The precipitated nebramycin complex-Lathanol salt is filtered and washed several times with water and once with acetone and is then pan-dried to afford 4.5 kg. of the dried nebramycin complex-Lethanol salt.

EXAMPLE 6

Separation of Nebramycin Factors by Gradient Elution

The more abundant nebramycins can be obtained as separate substances as follows: Two kilograms of the nebramycin complex, Lathanol salt, is dissolved in about 50 liters of 0.1 N ammonium hydroxide and loaded onto a column measuring 3.5 inches by 4 feet, and packed with eight liters of 100–200 mesh Bio-Rex 70 cation exchange resin in the ammonium cycle. (Bio-Rex 70 is an IRC–50 type resin available commercially from Bio-Rad Laboratories, Richmond, California). The column is washed with water to remove colored impurities and the Lathanol. A solution of 0.3 N ammonium hydroxide is gradually fed from an open reservoir into a closed mixing chamber containing 0.05 N ammonium hydroxide. As the eluting solution flows from the closed mixing chamber onto the column, an equal volume of 0.3 N $NH_4OH$ flows into the closed chamber from the open reservoir, thus gradually increasing the normality of the eluting ammonium hydroxide passing into the column. Eluent fractions of 500 ml. are collected, and each fraction is assayed to determine antibiotic activity. Fractions containing the same antibiotic factor are pooled and lyophilized to obtain the individual dried nebramycins. The individual nebramycins are distributed among the active fractions as follows:

| Fraction | Antibiotic Present | Weight (g.) |
|---|---|---|
| 1–52 | inactive | — |
| 53–57 | minor factors | 3.3 |
| 58–116 | Nebramycin II | 186.2 |
| 117–130 | minor factors | 9.2 |
| 131–164 | Nebramycin IV | 89.2 |
| 165–188 | Nebramycin V' | 41.1 |

EXAMPLE 7

Preparation of Helianthates of the Nebramycins

The preparation of the helianthates of the individual nebramycins is illustrated by the following procedure for the preparation of nebramycin II helianthate.

A solution of 2 g. nebramycin II in 22 ml. of water is prepared and adjusted to pH 5 by the addition of 50 percent sulfuric acid. A hot 10 percent aqueous solution of methylorange is then added to the antibiotic solution. The helianthate of nebramycin II separates as a precipitate and is removed by filtration. The solid salt is washed thoroughly with hot water and dried under vacuum to yield 3.5 g. of nebramycin II helianthate.

We claim:

1. An antibiotic substance selected from the class consisting of nebramycin II and the acid addition salts thereof: said nebramycin II being characterized as follows: a white crystalline compound having titratable groups of pK'a values of about 5.7, 6.7, 7.7, and 8.7 as determined by electrometric titration in water; has an apparent molecular weight of about 541 as determined from titration data; has a specific rotation, $[\alpha]^{25}_d$, of +162.5° (C=1, weight per volume); has the approximate percentage composition of C, 46.47; H, 7.99; N, 13.05; and O, 32.29; and has infrared spectral absorption maxima as a mineral oil mull of 3.02, 3.14, 6.05, 6.23, 7.4, 8.5, 8.75, 9.17, 9.65, 10.11, 11.15, 11.7, and 12.6 microns.

2. An antibiotic substance selected from the class consisting of nebramycin IV and the acid addition salts thereof; said nebramycin IV being characterized as follows: a basic substance having titratable groups of pK'a values of about 5.3, 6.8, 7.8, and 9.0 as determined by electr. titration in water; has an apparent molecular weight of about 478 as determined from titration data; has a specific rotation, $[\alpha]^{25}_D$, of +114°, (C=1, weight per volume); has the approximate percentage composition of C, 41.66; H, 7.78; N, 15.02; and O, 34.93; and has infrared absorption maxima as a mineral oil mull of 3.05, 3.17, 5.85, 6.27, 7.46, 8.75, 9.7, 10.5, 11.1, and 12.85 microns.

3. An antibiotic substance selected from the class consisting of nebramycin V and the acid addition salts thereof; said nebramycin V being characterized as follows: a crystalline white compound having titratable groups of pK'a values of about 5.5, 7.0, 8.0, and 9.1 as determined by electrometric titration in water; has an apparent molecular weight of about 424 as determined by titration; has a specific rotation, $[\alpha]^{25}_D$, of +118°, (C=1, weight per volume); has the approximate percentage composition of C, 41.05; H, 7.60; N, 13.62; O, 36.76; and has infrared spectral absorption maxima as a mineral oil mull of 3.05, 3.19, 6.32, 7.45, 8.75, 9.7, 11.15, and 12.25 microns.

4. An antibiotic substance selected from the class consisting of nebramycin V' and the acid addition salts thereof; said nebramycin V' being characterized as follows: a crystalline white substance which is soluble in ethanol, pyridine, dimethylformamide, and dimethylsulfoxide and substantially insoluble in the common ketone and ester solvents; has titratable groups of pK'a values of about 5.6, 6.9, 7.7, 8.6, and 9.9 as determined by electrometric titration; has an apparent molecular weight of about 510; has a specific rotation, $[\alpha]^{25}_D$, of +125°, (C=1, weight per volume); has the approximate percentage compositions of C, 41.6; H, 7.49; N, 14.9; O, 36.0; and has infrared spectral absorption maxima as a mineral oil mull of 2.87, 3.00, 3.18, 3.66, 5.75, 5.82, 6.1, 6.23, 6.28, 6.86, 7.03, 7.28, 7.37, 7.42, 7.61, 7.84, 7.95, 8.17, 8.47, 8.55, 8.77, 8.94, 9.23, 9.40, 9.63, 9.87, 10.08, 10.50, 11.36, 11.53, 11.61, 11.8, 12.5, 12.95, 13.46, and 14.00 microns.

5. An antibiotic substance selected from the class consisting of nebramycin VI and the acid addition salts thereof; said nebramycin VI being characterized as follows: a crystalline white substance having titratable groups of pK'a values of about 5.8, 6.8, 7.1, 7.9, and 9.3 as determined by electrometric titration in water; has a specific rotation, $[\alpha]^{25}_D$, of +131°, (C=1, weight per volume); has an apparent molecular weight of about 467 as determined by titration; has the approximate percentage composition of C, 44.3; H, 8.1; N, 14.3; O, 32.8; and has infrared spectral absorption maxima as a mineral oil mull of 3.05, 3.19, 6.35, 7.47, 8.75, 9.8, 12.3 and 12.95 microns.

6. An antibiotic complex designated as nebramycin which when adsorbed upon a cation exchange resin and subjected to a stepwise elution procedure employing 0.1 N ammonium hydroxide and 0.3 N ammonium hydroxide yields from about 35 to about 50 percent by weight of nebramycin II as defined in claim 1, about 15 to 20 percent by weight of nebramycin IV as defined in claim 2, about 30 percent by weight of nebramycin V as defined in claim 3, and a combined total of about 10 percent by weight of nebramycin V' as defined in claim 4, and nebramycin VI as defined in claim 5 said antibiotic complex being prepared by cultivating *Streptomyces tenebrarius*, ATCC 17920, in a culture medium containing assimilable sources of carbon, nitrogen, and inorganic salts under submerged aerobic conditions until a substantial amount of nebramycin is produced by said organism in said culture medium.

7. A method of producing nebramycin as defined in claim 6 which comprises cultivating *Streptomyces tenebrarius*, ATCC 17920, in a culture medium containing assimilable sources of carbon, nitrogen, and inorganic salts under submerged aerobic conditions until a substantial amount of antibiotic activity is imparted by said organism to said culture medium.

* * * * *

PO-1050
(5/69)

UNITED STATES PATENT OFFICE
CERTIFICATE OF CORRECTION

Patent No. 3,691,279           Dated September 12, 1972

Inventor(s) Robert Q. Thompson, William M. Stark and Calvin E. Higge

It is certified that error appears in the above-identified patent and that said Letters Patent are hereby corrected as shown below:

In column 10, line 11, "$LD_5$" should read --$LD_{50}$--.
In column 11, line 54, "(11-A2bv)" should read --(11-A2)--; and at line 63, "(4-D1a)" should read --(4-D1)--.
In column 12, line 28, "(11-C2b)" should read --(11-C2)--.
In column 13, in Table IV at line 30, --Sucrose-- should appear as the last entry in the column headed "Carbon Source", and --(+)-- should appear as the last entry in the column headed "Response". In column 19, line 5, "$CoCl_2 \cdot H_2O$" should read --$CoCl_2 \cdot 6H_2O$--; at line 25 in the right hand column of the table, "t0.3%" should read --0.3%--, and the next lower entry reading "0.5%" should read --0.05%--.
In column 23, line 5, "electr." should read --electrometric--.
In column 23, claim 3 should be deleted.

Signed and sealed this 27th day of November 1973.

(SEAL)
Attest:

EDWARD M. FLETCHER, JR.          RENE D. TEGTMEYER
Attesting Officer                Acting Commissioner of Patents